April 16, 1946.	A. BURGENI ET AL	2,398,516
METHOD OF WETTING THREAD
Filed April 7, 1942	9 Sheets-Sheet 1
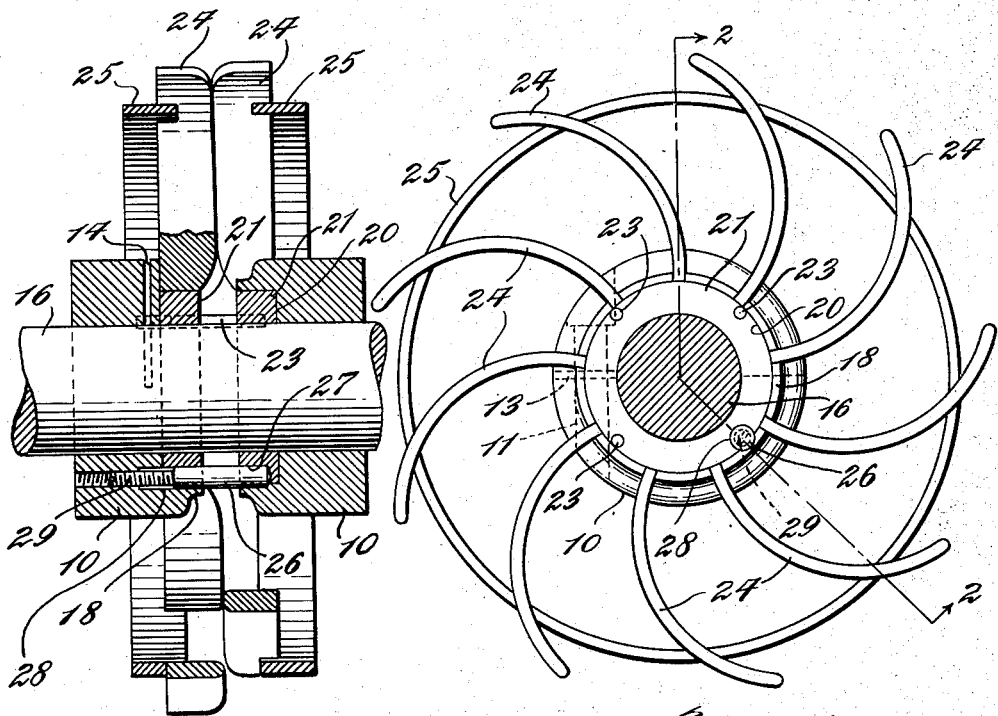
Fig. 1.
Fig. 2.
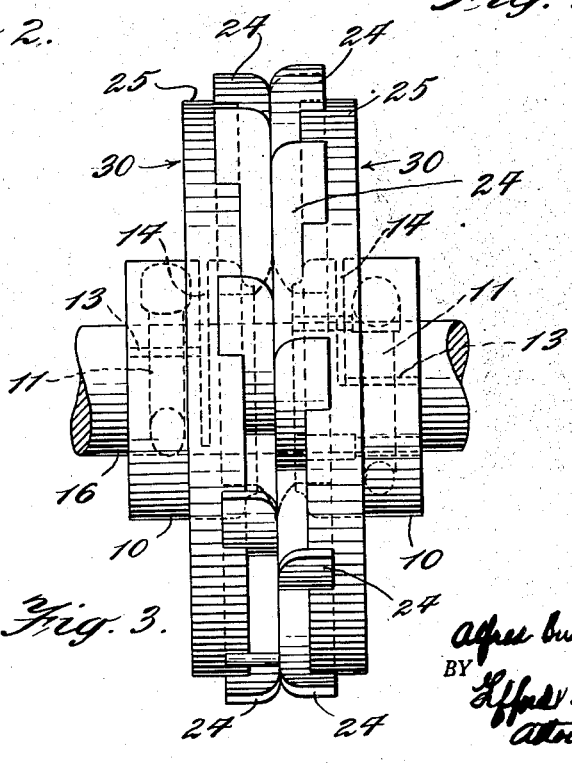
Fig. 3.
INVENTORS

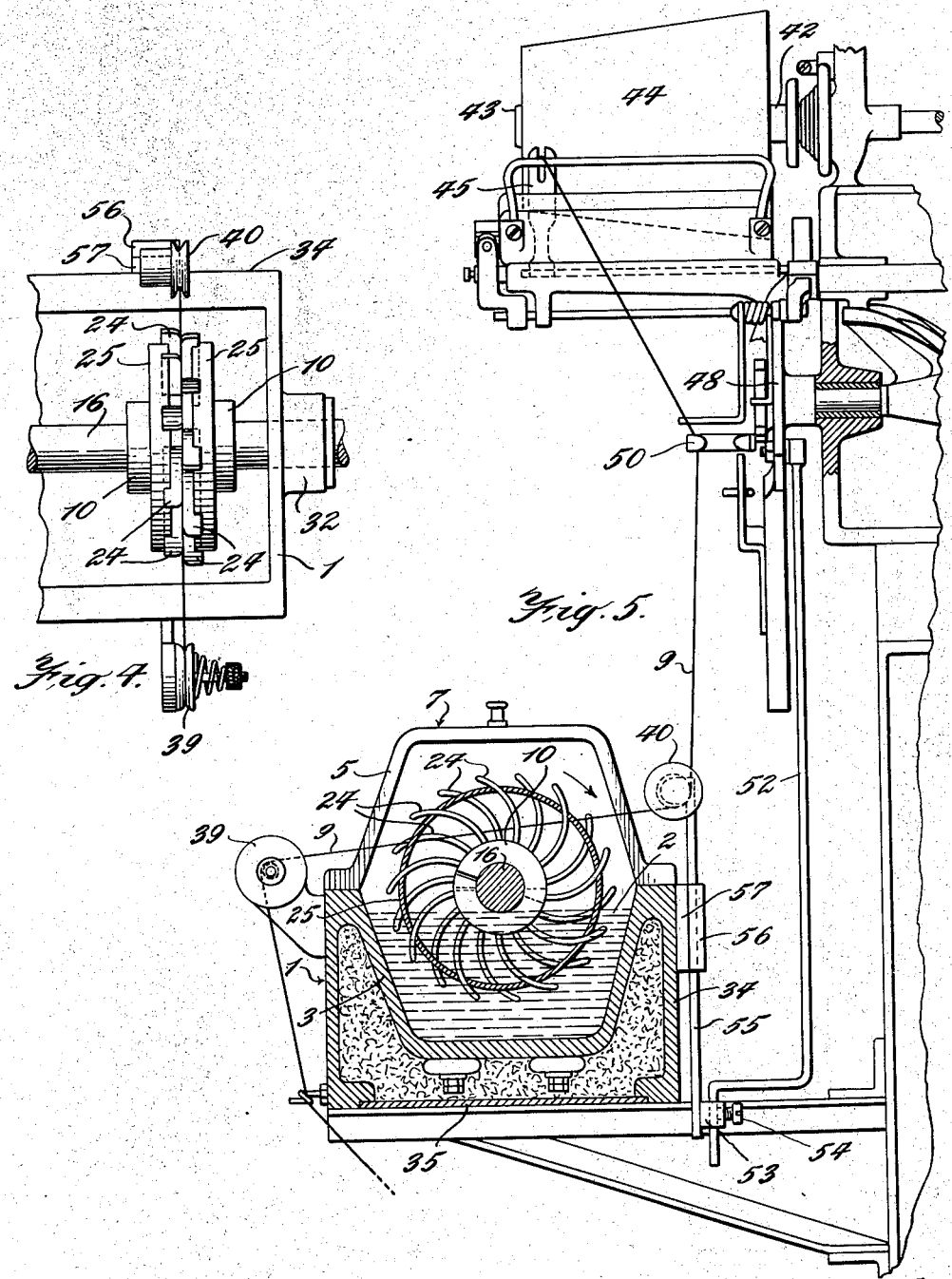

April 16, 1946. A. BURGENI ET AL 2,398,516
METHOD OF WETTING THREAD
Filed April 7, 1942 9 Sheets-Sheet 4

INVENTORS

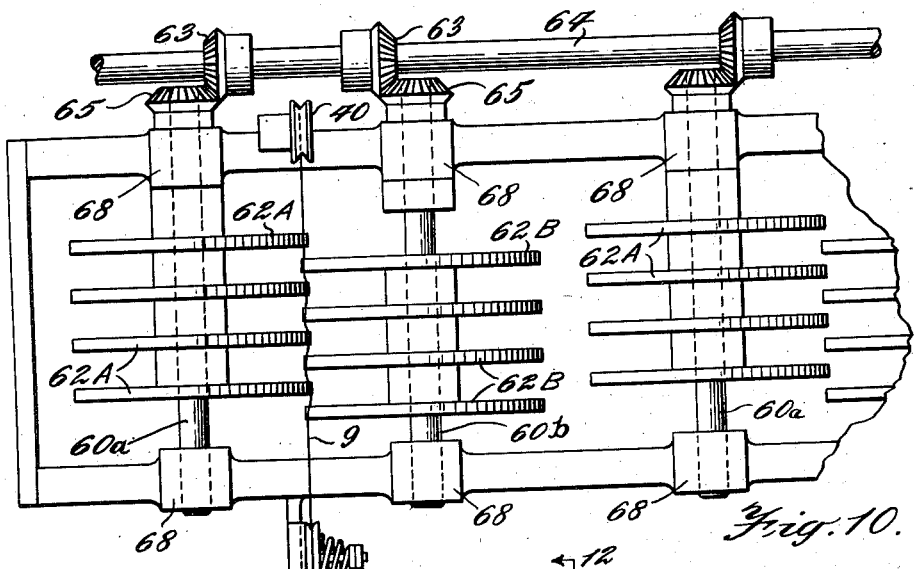
Fig. 10.
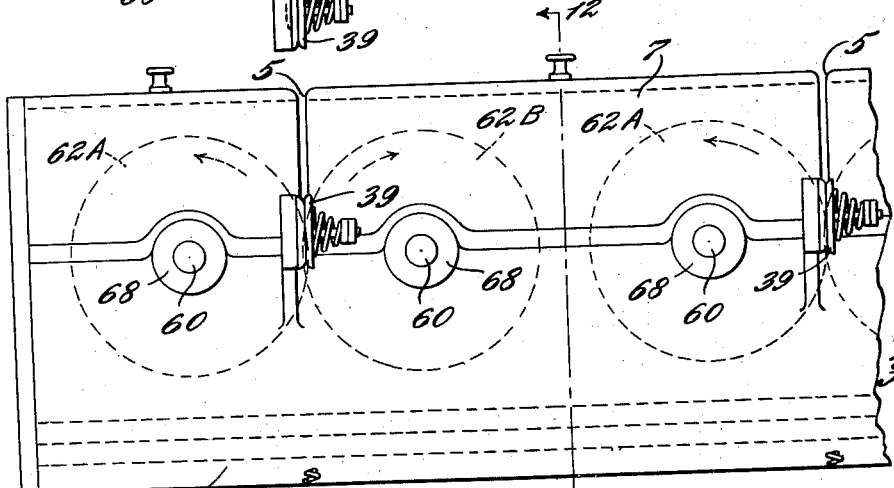
Fig. 11.
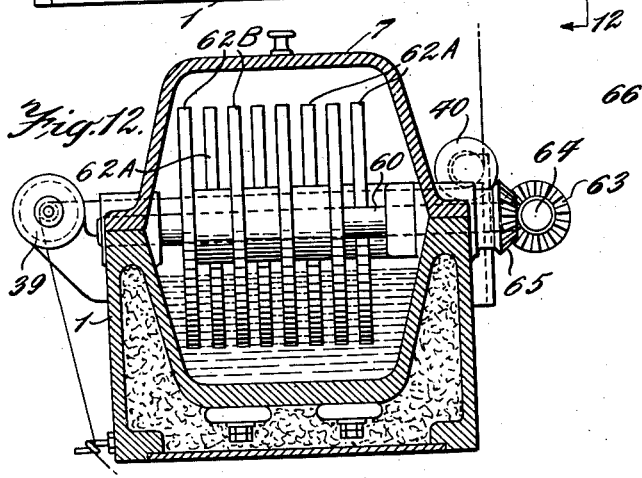
Fig. 12.
Fig. 13.
Fig. 14.
INVENTORS

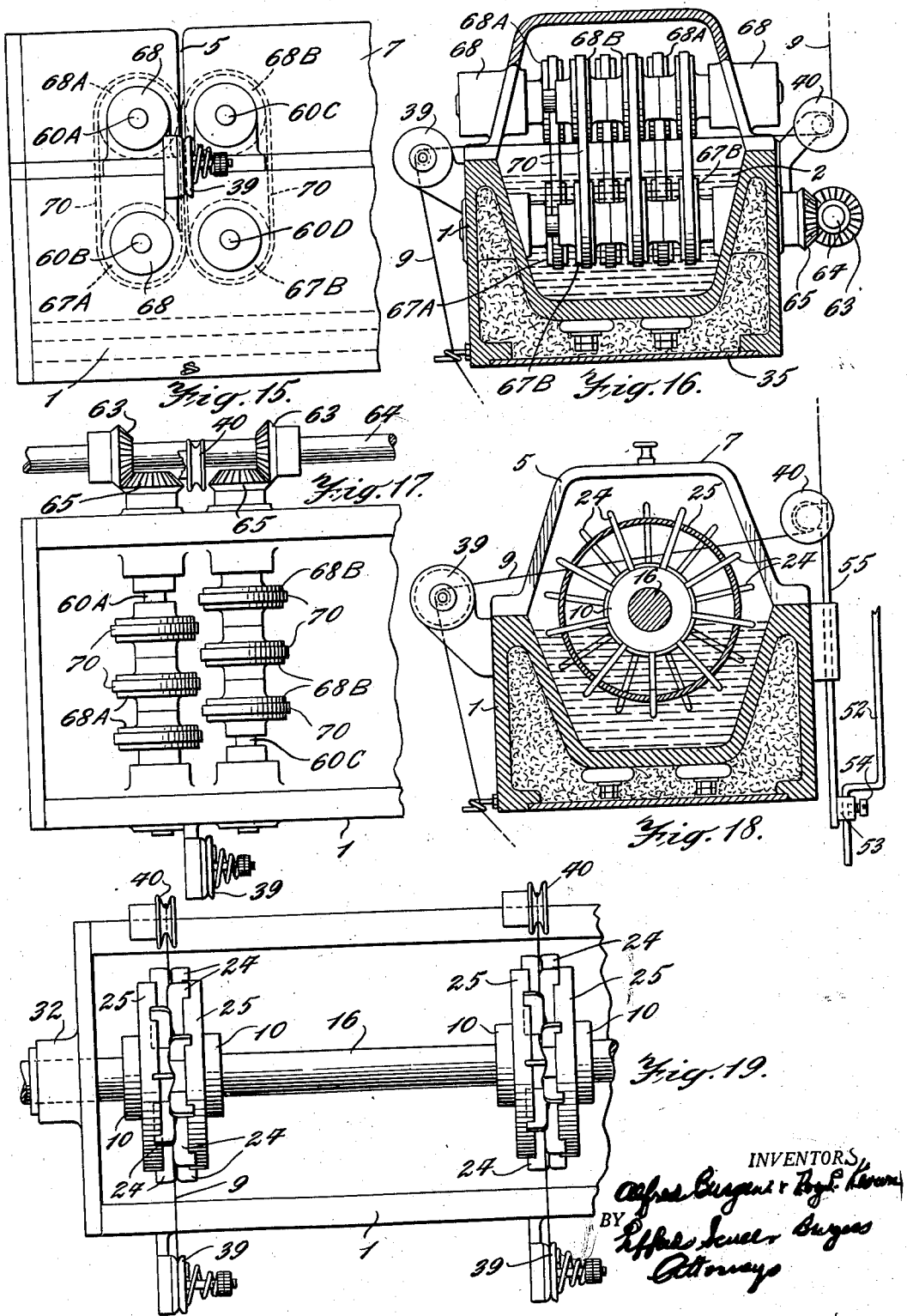

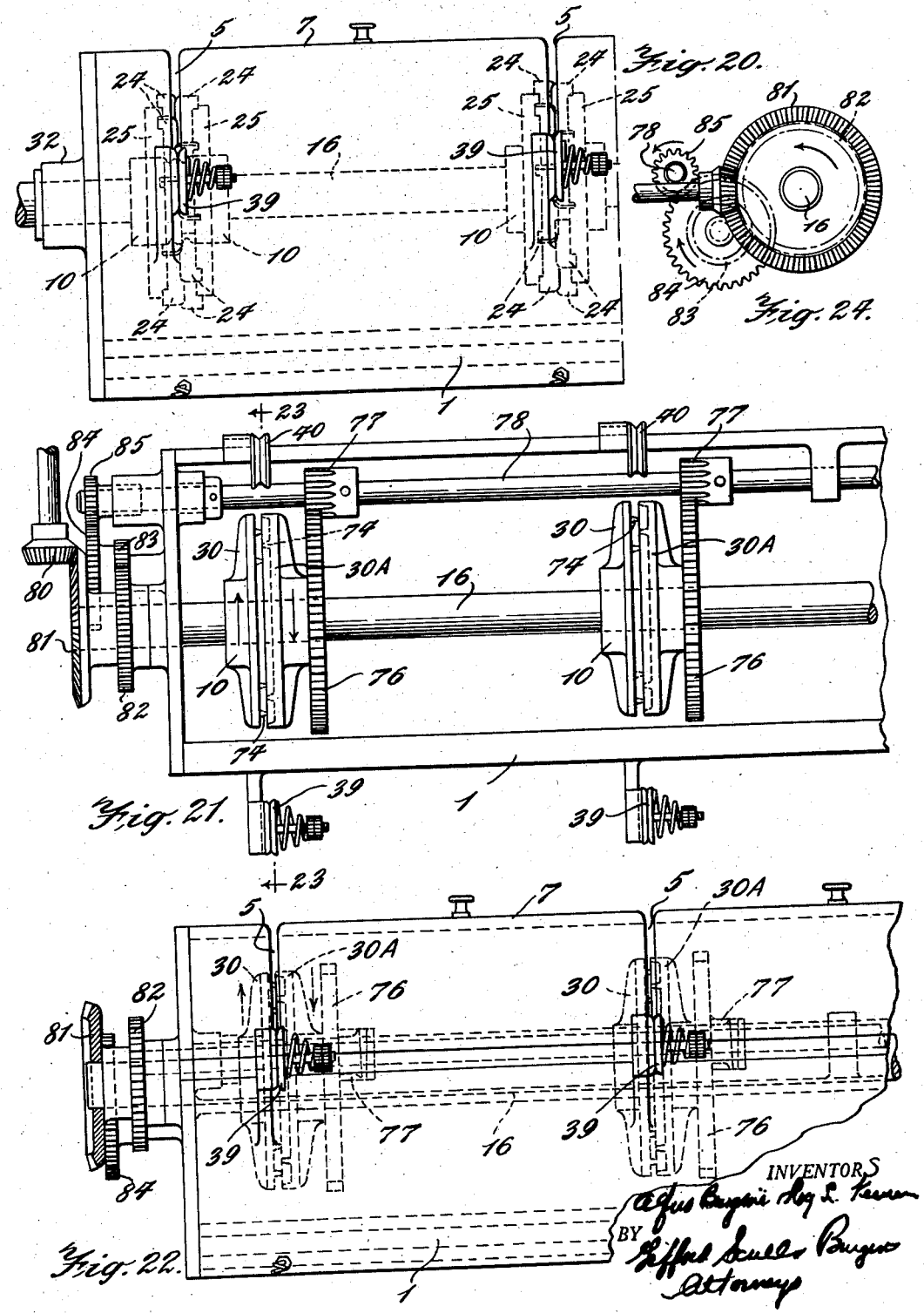

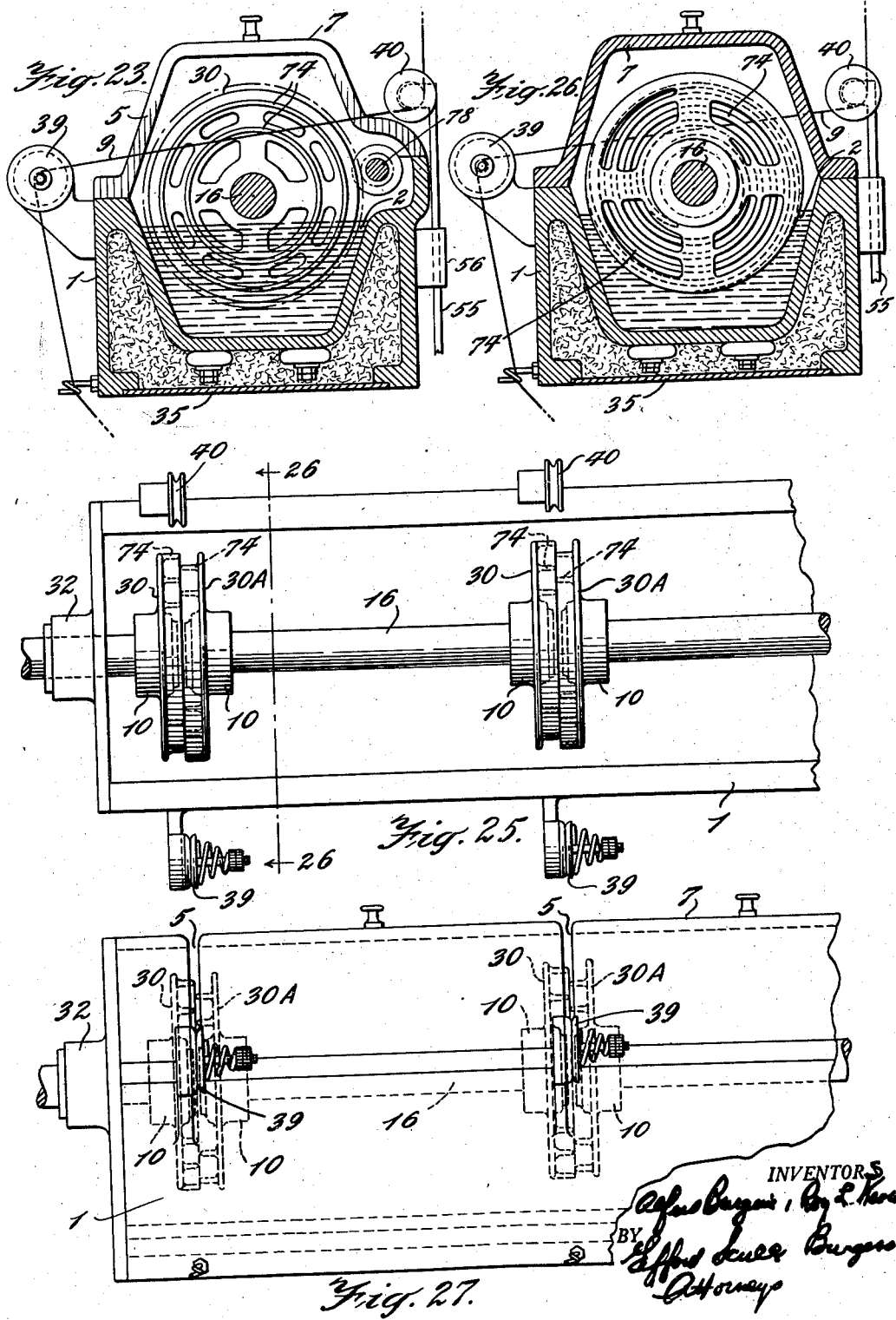

Patented Apr. 16, 1946

2,398,516

UNITED STATES PATENT OFFICE 2,398,516

METHOD OF WETTING THREAD

Alfred Burgeni, East Orange, and Roy L. Keown, Belleville, N. J., assignors to The Clark Thread Company, Newark, N. J., a corporation of New Jersey Application April 7, 1942, Serial No. 437,956

5 Claims. (Cl. 117—66)

This invention relates to the treatment of fibrous strands, thread cord and the like, with liquids, solutions, emulsions, etc., to condition the strands for various purposes.

It is an object of the invention to provide an improved process of effecting such treatment.

It is a further object to provide various kinds of apparatus for carrying on the process.

It is a specific object to provide process and apparatus for the waxing of fibrous strands.

The invention will be defined in the claims and illustrated by the following description taken in conjunction with the drawings in which:

Fig. 1 is a side elevation of a part of an applicator device;

Fig. 2 is a section on line 2—2 of Fig. 1;

Fig. 3 shows two of the parts illustrated in Figs. 1 and 2 assembled on a shaft;

Fig. 4 is a fragmentary view of the applicator device (shown in Figs. 1 to 3) mounted in a treating chamber;

Fig. 5 is an end elevation, partly in section, showing an assembly of applicator device, treating chamber, together with tensioning, guiding and winding mechanism for the thread;

Fig. 10 is a plan view of a disc form of applicator device mounted in a treating chamber;

Fig. 11 is a front elevation of the same;

Fig. 12 is a section on line 12—12 of Fig. 11;

Fig. 13 is a fragmentary view of one of the discs of the device shown in Figs. 10 to 12;

Fig. 14 is a fragmentary view of a modified form of disc;

Fig. 15 is a fragmentary front elevational view of an endless belt form of applicator device mounted in a treating chamber;

Fig. 16 is an end view of the same, partly in section;

Fig. 17 is a plan view of the same;

Fig. 18 is an end view of another form of applicator device, partly in section;

Fig. 19 is a plan view of the same;

Fig. 20 is a front elevational view of the same;

Fig. 21 is a plan view of an applicator device comprising two discs provided with concentric rings and mounted in a treatment chamber so that the discs of each such device rotate in opposite directions;

Fig. 22 is a front elevational view of the same;

Fig. 23 is a section approximately on line 23—23 of Fig. 21 showing the strand in contact with the rings of one of the discs of an applicator device;

Fig. 24 is a detail of the gearing shown in plan at the left of Fig. 21, to provide for opposite rotation of the discs constituting an applicator device;

Fig. 25 is a plan view of still another form of applicator device comprising two discs, each carrying spiral ribs thereon;

Fig. 26 is a view, partly in section, on the line 26—26 of Fig. 25;

Fig. 27 is a front elevation of the same;

Figure 6:
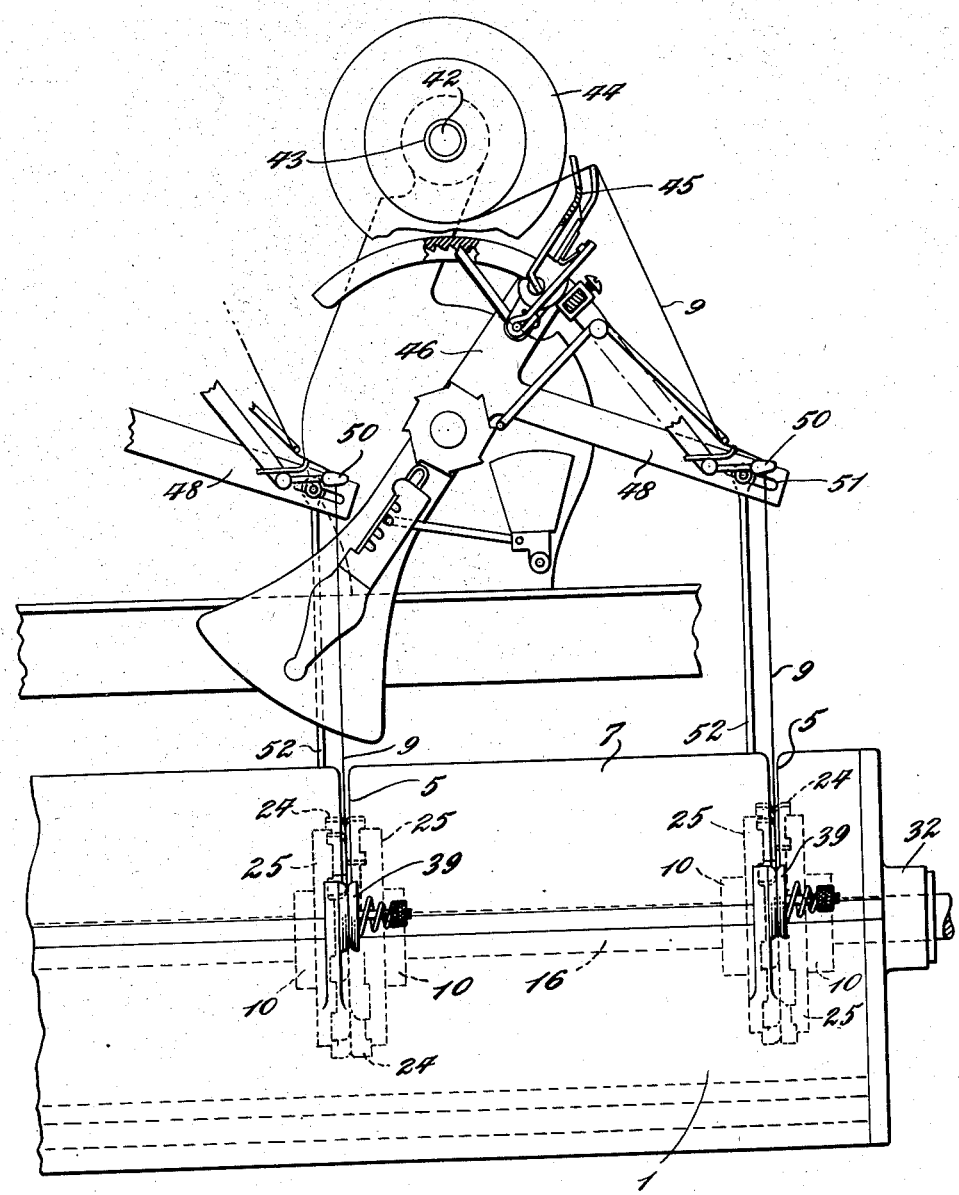
Fig. 6 is a front elevation of the apparatus of Fig. 5.

This is a continuation-in-part of our copending application Ser. No. 376,344, filed January 28, 1941.

First the apparatus will be described and then the process which is capable of being carried out in that and other types of apparatus.

Referring to Figs. 4 to 27, the casing comprises a treating chamber 1 containing a liquid impregnant or finishing material 2 separated by the wall 3 from the hollow heating chamber which may be supplied with a suitable heating medium, e. g., steam or heating liquid.

Apertures 5 in the cover 7 are provided to pass the thread 9 through the chamber in a predetermined path longitudinally of the axis of the thread. That path may be straight or curved or zigzag as hereinafter explained.

The liquid material to be applied to the strand may be any liquid impregnating material which has a viscosity at the temperature of the bath in the casing low enough to enable the material to be carried as a thin film by the surfaces of applicator elements. Fusible waxes, oils and mixtures thereof, solutions of liquid and solid materials in solvents, emulsions, etc., may be employed.

Referring to Figs. 1 to 6, inclusive, a split hub 10 is mounted on a shaft and secured thereto by a screw 11 passing through the jaws of the split portion of the hub 10 and passing through the slot 13. A semicircular slot 14 perpendicular to the slot 13 and to the axis of the shaft 16 is provided to aid in binding the hub to the shaft. The hub 10 carries an annular flange 18 defining an annular recess 20 into which is set a bushing or ring 21 carrying aligning pins 23 spaced apart circumferentially. To the annular flange 18 radial arcuate blades 24 are integrally joined at their inner ends, the blades being secured together by and joined, near their outer ends, by an annular rim 25. The bushing 21 is keyed to the hub 10 by a positioning pin 26, which also serves to position the blades 24 relative to one another.

Pin 26, which is fixed in a socket 27 of one of the parts 30, is slidingly fitted, in assembling, into socket 28 of the companion part.

The depth of this socket 28 is predetermined by a regulating screw 29 which acts as a stop, to position the parts 30, 30 before they are secured to shaft 16.

Two of the parts 30 assembled as shown in Fig. 3 constitute an applicator device. The blades 24 of the two parts 30 are radially offset or staggered. They may and preferably are also axially staggered so that the edges of the blades 24 (the facing edges) overlap. The extent of this overlap can be controlled by adjusting the hub 10 on the shaft 16 by means of the adjusting pin 26. This adjustment is facilitated by the slot 14. The radial offset of the blades of one part of the applicator in relation to the blades of the companion part may be assisted by means of aligning pins 23 secured to the bushing 21 of that part, which pins are received in sockets in the corresponding bushing of the companion part.

As many applicator devices as desired may be mounted on a shaft in a treatment chamber 1.

Fig. 6 shows two such devices mounted on the shaft 16. As shown in Figs. 4, 5 and 6, the shaft 16 and applicator devices carried thereby are rotatably mounted in a treatment chamber and provided with means (not specifically shown) to effect rotation of the shaft, which extends through bearings 32 in the end walls thereof.

The treatment chamber 1 may comprise a casting 34 having a sealing plate 35 set into the bottom thereof to provide a hollow heating chamber to which any suitable heating fluid, e. g. steam, may be supplied. To the casting 34 is secured a cover 7 to provide a chamber containing any desired treating material, e. g. wax, oil, solutions of treating material in a solvent or emulsions of such treating material in an aqueous medium. In a typical case, the treating material is a wax preparation requiring an elevated temperature to maintain it in a condition of suitable liquidity and viscosity.

For each applicator device there is provided a tensioning device 39 and a guide roll 40 supported on suitable brackets, as shown, and a slot 5 in the cover 7, together with suitable winding mechanism, one form of which is shown in Figs. 5 and 6.

In practicing the process of the invention by using the apparatus of Figs. 1 to 6, thread or cord, for example, is drawn under tension from a supply package (not shown) through the treatment chamber 1, under the guide roll 40 and to the winding mechanism. The strand or thread 9 passes between the facing edges of the blades 24 of the applicator, the path of the thread being longitudinal of the axis of the thread, generally. In passing between the blades, the path of the thread will be zigzag more or less depending on whether the facing edges of the blades 24 lie in the same plane or are overlapped in the direction of the axis of the shaft. The surfaces of the edges of the blades carry a liquid film of treating material thereon and, by the rotation of the shaft 16, move in paths transverse to the axis of the strand 9. In so moving, those surfaces wipe the thread at points spaced apart circumferentially of the thread. The wiping also takes place at points or areas spaced apart longitudinally of the thread.

This process makes possible a uniform and thorough application of treating material and an adequate control of the proportion of treating material applied to a given amount of thread since all the variables contributing to the attainment of this result may be controlled. These factors include the area of the surfaces which wipe the thread, the viscosity of the treating material, the rate of movement of the wiping surfaces and the linear speed of the thread. In addition, the contacting of the thread at points spaced apart circumferentially of the thread, by surfaces moving in paths transverse to the axis of the thread and carrying a film of liquid thereon, makes possible a thoroughness and control of treatment not heretofore obtainable.

In order to compensate for the increase in linear speed caused by increase in diameter of the package wound on the take-up spool, provision may be made to increase the rate of area contact of the applicator surfaces in consonance with the increase in said linear speed. One way of doing this is to shift the axis of the thread radially inward toward the axis of the shaft in apparatus of the type shown in Figs. 1 to 6, and 18 to 27. Such mechanism is illustrated in Figs. 5 and 6 in conjunction with a conventional form of winding device. The details of the winding device need not be described except to state that it includes a mandrel 42 on which is rotatably mounted a bobbin 43 on which is wound a strand mass 44, and traverse mechanism 45 carried by pivoted traverse frame 46. To this frame 46 is secured an arm 48 to which is secured a bracket carrying a thread guide 50. In a slot 51 at the end of the arm 48 there is pivoted a depending rod 52 carrying a bracket 53 secured to the end thereof by a screw 54. To this bracket is secured a rod 55 mounted to slide in a sleeve 56 in a bearing member 57 secured to the casting 34. On the upper end of this rod 55, the guide roll 40 is rotatably mounted.

Thus as the diameter of the package increases, and the linear speed of the thread or strand increases, the arm 48, rods 52 and 55, and guide roll 40 are lowered and the strand axis moves toward the axis of the shaft 16.

Referring to Figs. 18, 19 and 20, the construction and operation thereof are similar except that the blades 24 of the applicator device are radially straight instead of arcuate.

Figures 7, 8:
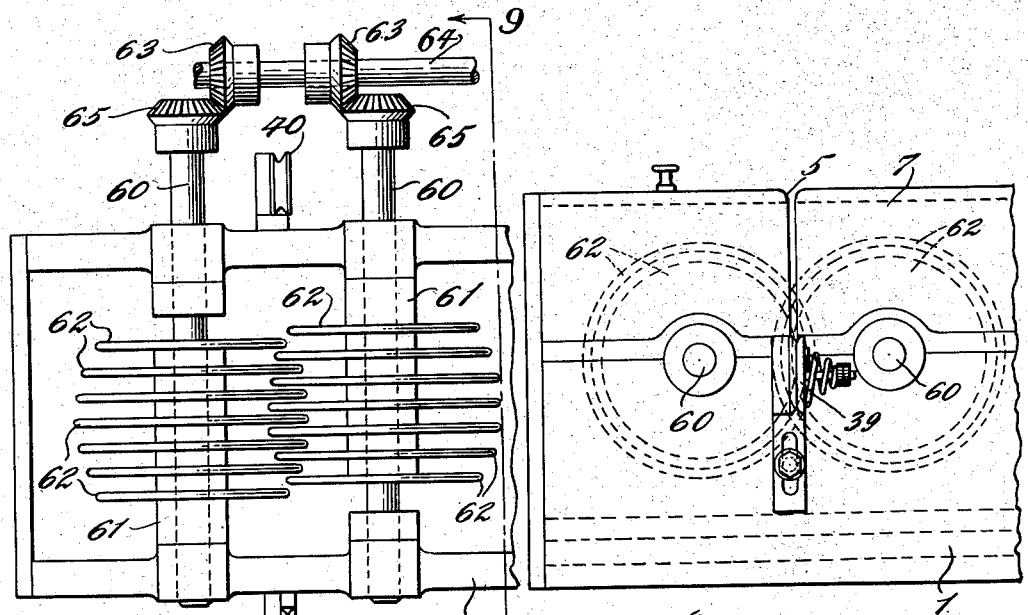
Fig. 7 is a fragmentary plan view of a different form of applicator device.
Fig. 8 is a front elevation of the same.
Figure 9:
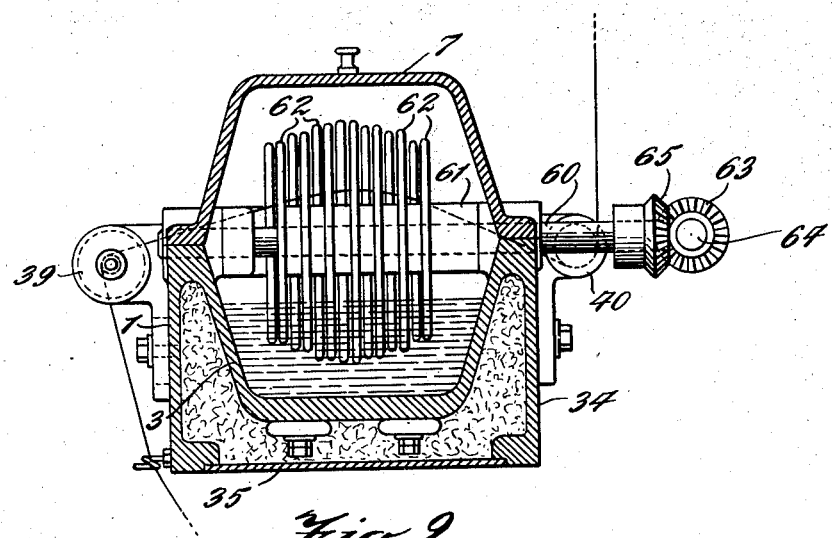
Fig. 9 is an end elevation of the same, partly in section, looking in the direction of the arrow shown in Fig. 7.

Referring to Figs. 7, 8, and 9, shafts 60 are mounted to rotate in opposite directions about axes parallel to the plane containing the axis of the strand. On each shaft 60, there is mounted a hub 61 to which discs 62 of different diameters are secured, the diameters of the several discs 62 progressively increasing and decreasing, as shown. The two groups of discs are disposed in staggered and overlapped spaced relation. As a result, a line connecting the points of intersection of each successive pair of adjacent discs (if said circumferences were projected on the same plane) is a curved line, as shown in Fig. 9. The shafts 60 are driven in opposite directions by gears 63 mounted on shaft 64 meshing with gears 65 mounted on shafts 60.

In operation, the tension means 39 and guide roll 40 are arranged so that the path of the thread follows this curved line. The surfaces of the edges of the opposed disks 62 therefore move in paths perpendicular to the axis of the thread or strand and wipe it at points spaced apart circumferentially and longitudinally of the strand.

Referring to Figs. 10, 11 and 12, shafts 60 mounted in bearings 68 are provided with gears 65 meshing with gears 63 on drive shaft 64. Rotation of drive shaft 64 in a clockwise direction causes one shaft 60 to rotate in counterclockwise direction and the other shaft 60 in the opposite or clockwise direction. Discs 62A of the same diameter are mounted on shaft 60A and similar discs 62B of the same diameter are mounted on shaft 60B. Discs 62B are offset axially and radially in relation to discs 62A so that there is a radial overlap. Guide roll 40 and tension device 39 are positioned so that the fibrous strand passes between the overlapped edges of the discs 62A, 62B in a zigzag path longitudinally of the axis of the strand. The discs pick up liquid treating material from the bath and the surfaces of the facing edges of the said discs wipe the strand at a plurality of points spaced apart circumferentially of the strand also at a plurality of points spaced apart longitudinally of the strand. The edges 66 of the discs may be plain as shown in Fig. 13, or grooved as shown in Fig. 14.

Referring to Figs. 15, 16, and 17, a driving pulley 67A and a driven pulley 68A are mounted on shafts 60A, 60B running in bearings 68 and another driving pulley 67B and driven pulley 68B are mounted on shafts 60C, 60D running in bearings 68. The driven shafts are provided with gears 65 meshing with gears 63 so that the pulleys of each group rotate, respectively, in opposite directions. Each group of driving and driven pulleys is provided with an endless belt 70 having a smooth surface. The pulleys 67A, 68A are mounted in staggered or offset relation, axially, in relation to the pulleys 67B, 68B and the axes of the shafts 60A are mounted in such spaced relation to the axes of the shafts 60C, 60D, respectively, that the facing surfaces of the belts 70 are, preferably, slightly overlapped.

The fibrous strand is passed between these surfaces from tension device 39 to guide pulley 40. The said surfaces pick up liquid material from the bath, move in paths transverse to the axis of the strand and wipe it at a plurality of points spaced apart circumferentially and longitudinally thereof.

Referring to Figs. 21, 22, 23 and 24, each applicator device comprises a member 30 having a disc part and a hub portion 10, the former having concentric rings 74 on the face thereof, and a complementary member 30A, the rings 74 of the members 30 and 30A being radially offset in relation to each other. The hubs 10 may be mounted on the shaft 16 in the manner shown and described in connection with Figs. 1, 2, and 3, so as to be secured thereto and rotate therewith. Complementary members 30A may be, and as shown are, on the contrary mounted to and run loose on the shaft 16, i. e. independently thereof, so that they may be driven in a direction opposite to that of members 30. For this purpose the complementary members 30A are secured to gears 76 meshing with gears 77 secured to the jack shaft 78. Any suitable means (not specifically shown) may be employed to control and maintain the axial alignment of the free and running members 30A and this alignment may be such as to provide any desired degree of axial overlap of the facing edges of the rings 74 on the members 30 in relation to those of the complementary members 30A so that the strand in passing between and in contact with the facing edge surfaces of the rings 74 may be caused to pursue a more or less zigzag path, the strand being passed under tension from the tension member 39 to the guide pulley 40 as illustrated in Fig. 23. Rotation of the jack shaft 78 and main shaft 16 in opposite directions may be caused by a train of gears 80 to 85, as shown in Figs. 21 and 24.

Here again, in practicing the method, the strand is passed in a path longitudinally of the axis thereof and is wiped at a plurality of points spaced apart circumferentially of the thread by surfaces carrying a film of liquid thereon and moving in paths transverse to the path of the strand.

Referring to Figs. 25, 26 and 27, the configuration and structure of the complementary members 30, 30A of the applicator device are similar to those of Figs. 21, 22 and 23 except that the ribs or rings 74 are spiral or convolute instead of concentric. Although said members 30, 30A may be mounted for rotation in opposite directions, they are shown in Figs. 25 and 27 as secured to the shaft 16 for rotation in unison therewith and with each other and the hubs 10 may therefore be constructed and secured to said shaft as shown in detail in Figs. 2 and 3.

Figure 28:
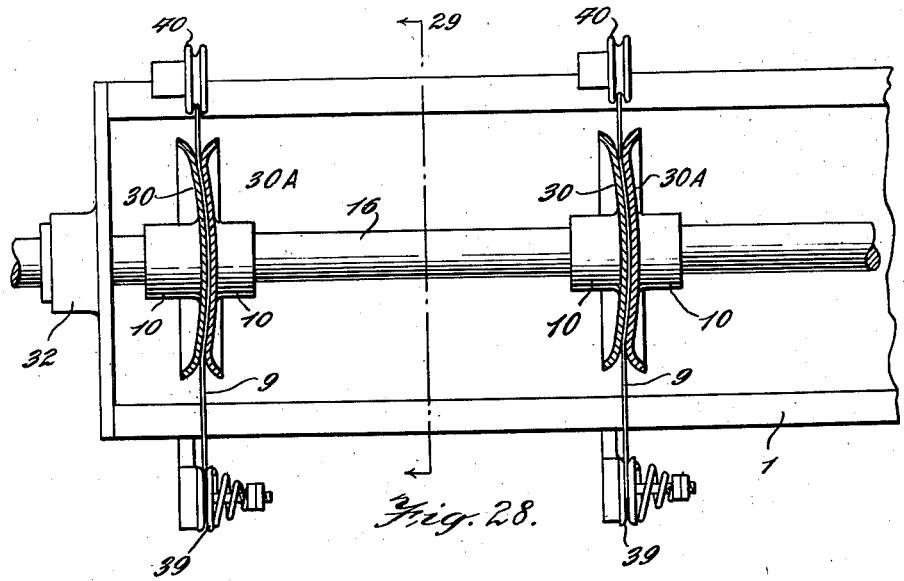
Fig. 28 is a plan view, partly in section, of an applicator device comprising a pair of discs having a concave-convex configuration and relation.
Figure 29:
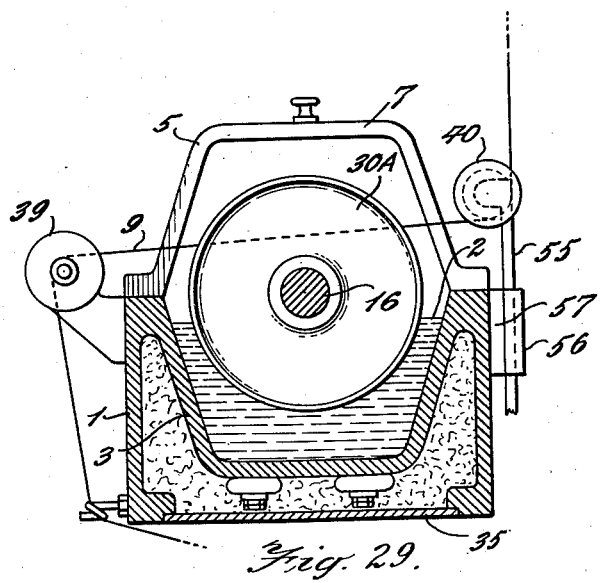
Fig. 29 is a section on the line 29—29 of Fig. 28.

Referring to Figs. 28 and 29, the structure is similar to that shown in Figs. 21 to 27 except that, instead of discs carrying concentric or spirally arranged rings or ribs thereon, one of each pair of applicator elements is a convex or dished member 30 and the other is a complementary concave member 30A, the members 30 and 30A being mounted on the shaft 16 in spaced relation, the space therebetween being just sufficient to cause the thread or strand 9 passing from the tension device 39 to the guide roll 40 to contact the opposed surfaces of the discs or members 30A. The contact surfaces of these members 30, 30A move in paths transverse to the path of the strand 9 and wipe it at points spaced apart circumferentially of the thread as well as at points spaced apart longitudinally thereof. The configuration of the members 30, 30A causes the strand 9 to take a somewhat arcuate path in its longitudinal movement, although the strand passes generally in a path longitudinally of the axis of said strand.

We claim:
1. The method of treating a fibrous strand with a liquid finishing agent which comprises passing the strand in a predetermined zigzag path longitudinally of the axis of the strand, wiping the strand while moving in said path at a plurality of points spaced apart circumferentially of the strand, with at least two separate surfaces moving in paths transverse to the axis of the strand at their points of contact therewith, and carrying a liquid film of finishing agent to the strand by each of said surfaces.

2. The method of treating a fibrous strand with a liquid finishing agent which comprises passing the strand in a predetermined zigzag path longitudinally of the axis of the strand, wiping the strand while moving in said path at a plurality of points spaced apart circumferentially and longitudinally of the strand, with surfaces moving in paths transverse to the axis of the strand at their points of contact therewith, and carrying a liquid film of finishing agent to the strand by each of said surfaces.

3. The method of treating a fibrous strand with a liquid coating agent which comprises moving the strand longitudinally of its axis, moving a plurality of coating surfaces alternately into and out of a source of liquid coating agent and into and out of wiping contact with the moving strand at a plurality of circumferentially spaced points of the strand, said coating surfaces moving, during wiping contact with said strand, in paths transverse to the axis of the strand, and maintaining said strand out of contact with said source of liquid coating agent.

4. The method of treating a fibrous strand with a liquid coating agent which comprises passing the strand in a predetermined path between a plurality of coating surfaces, said surfaces being mounted for rotation about a common axis, wiping said strand while moving in said path at a plurality of points spaced apart circumferentially of the strand by means of said surfaces on each of two opposite sides of the strand, said surfaces moving, during contact with said strand, in paths transverse to the axis of the strand, collecting the coated strand on a winding package, and increasing the rate of coating by shifting the moving strand nearer to the axis of said coating surfaces as the linear speed of the strand increases due to increase in size of said package.

5. The method of treating a fibrous strand with a liquid coating agent which comprises passing the strand longitudinally of its axis between a plurality of coating surfaces while, intermediate the points of entrance to and exit from said surfaces, laterally distorting the strand from a straight path, wiping said strand while moving in said distorted path at a plurality of points spaced apart circumferentially of the strand by means of said surfaces on each of two opposite sides of the strand, said surfaces moving, during contact with said strand, in paths transverse to the axis of the strand and thereby applying a liquid film of coating agent to the strand, and maintaining said strand out of contact with said source of liquid coating agent.

ALFRED BURGENI.
ROY L. KEOWN.